United States Patent
Won

(10) Patent No.: US 10,946,892 B2
(45) Date of Patent: Mar. 16, 2021

(54) ELECTRIC POWER STEERING APPARATUS HAVING INCREASED NUMBER OF SENSOR SIGNALS FOR SAFETY ENHANCEMENT

(71) Applicant: MANDO CORPORATION, Gyeonggi-do (KR)

(72) Inventor: Woo Seok Won, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 395 days.

(21) Appl. No.: 16/162,522

(22) Filed: Oct. 17, 2018

(65) Prior Publication Data

US 2019/0118857 A1 Apr. 25, 2019

(30) Foreign Application Priority Data

Oct. 24, 2017 (KR) .................. 10-2017-0138102

(51) Int. Cl.
*B62D 5/04* (2006.01)
*B62D 15/02* (2006.01)

(52) U.S. Cl.
CPC .......... *B62D 5/0484* (2013.01); *B62D 5/049* (2013.01); *B62D 5/0463* (2013.01); *B62D 15/021* (2013.01)

(58) Field of Classification Search
CPC .... B62D 5/0457; B62D 5/046; B62D 5/0484; B62D 5/049
See application file for complete search history.

(56) References Cited

U.S. PATENT DOCUMENTS

| 9,250,147 | B2* | 2/2016 | Garshelis | G01L 3/103 |
| 10,053,142 | B2* | 8/2018 | Hisanaga | B62D 5/0493 |
| 10,330,542 | B1* | 6/2019 | Pearce | B62D 6/10 |
| 10,604,175 | B2* | 3/2020 | Patel | B62D 5/0484 |
| 10,822,023 | B2* | 11/2020 | Won | B62D 5/0484 |
| 2003/0098197 | A1* | 5/2003 | Laurent | H02K 7/06 |
| | | | | 180/401 |

FOREIGN PATENT DOCUMENTS

| KR | 10-0833565 | 5/2008 |
| KR | 10-1728992 | 4/2017 |
| KR | 10-2017-0065430 | 6/2017 |

OTHER PUBLICATIONS

Office Action dated Dec. 14, 2018 for Korean Patent Application No. 10-2017-0138102 and its English machine translation by Google Translate.

* cited by examiner

*Primary Examiner* — Tony H Winner
(74) *Attorney, Agent, or Firm* — Ladas & Parry, LLP

(57) ABSTRACT

The present disclosure relates to an electric power steering apparatus. An embodiment of the present disclosure provides an electric power steering apparatus including a three-channel torque sensor, a three-channel motor position sensor, and a single-wound BLAC motor, and an ECU configured to control steering.

6 Claims, 4 Drawing Sheets

ELECTRIC POWER STEERING APPARATUS HAVING INCREASED NUMBER OF SENSOR SIGNALS FOR SAFETY ENHANCEMENT

CROSS REFERENCE TO RELATED APPLICATION

This application claims priority from Korean Patent Application No. 10-2017-0138102, filed on Oct. 24, 2017, which is hereby incorporated by reference for all purposes as if fully set forth herein.

BACKGROUND OF THE INVENTION

1. Field of the Invention

The present disclosure relates to an electric power steering apparatus, and more particularly, to an electric power steering apparatus in which the number of signals of a torque sensor and a motor position sensor in the electric steering apparatus increases such that steering is normally performed even if an abnormality occurs in some of the sensor signals.

2. Description of the Prior Art

Recently, vehicles are being provided with increasingly more electronic functions, and various electronic devices are installed in vehicles.

In order to control the electronic devices, vehicles are generally provided with an Electronic Control Unit (hereinafter, referred to as an "ECU") that receives electrical signals detected by various input sensors and outputs digital control signals for driving various actuators on the output side thereof. An electric power steering apparatus is capable of controlling the steering of the vehicle based on the above-described ECU.

In recent years, there has been an increasing need for reliability in such an electric power steering apparatus. Accordingly, there is a growing need to find a way to improve the safety level of an electronic system which contributes to the reliability among the components of the electric power steering apparatus. In particular, the importance of a safety improvement in the electric power steering apparatus is emphasized in that it can be combined with new technologies such as automatic driving in the future.

SUMMARY OF THE INVENTION

Accordingly, the present disclosure provides an electric power steering apparatus, in which reliability is improved compared to an existing electric power steering apparatus by increasing the number of signals of a torque sensor and a motor position sensor therein.

In order to solve the problems described above, an embodiment of the present disclosure provides an electric power steering apparatus including a three-channel torque sensor, a three-channel motor position sensor, a single-wound Brushless AC (BLAC) motor, and an ECU configured to control steering.

Another embodiment of the present disclosure provides an electric power steering apparatus including a four-channel torque sensor including two independent dual die ICs, a three-channel motor position sensor, a single-wound BLAC motor, and an ECU configured to control steering.

According to the present disclosure, even when an abnormality occurs in some sensors constituting the electric power steering apparatus, it is possible to normally control steering using another sensor and to improve the safety level of the entire vehicle.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
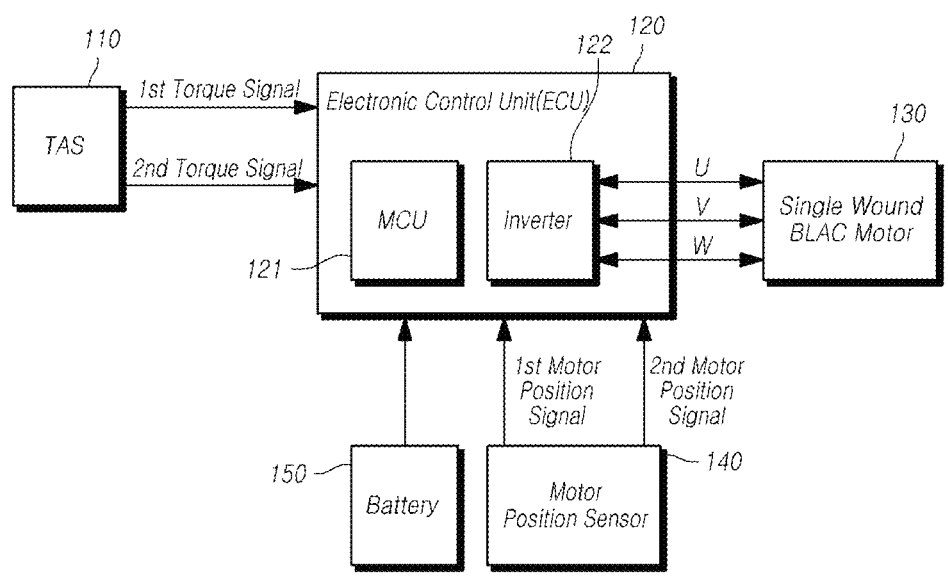
FIG. 1 is a diagram illustrating the configuration of an existing electric power steering apparatus.

Hereinafter, embodiments of the present disclosure will be described in detail with reference to the accompanying drawings. In the following description, the same components will be designated by the same reference numerals although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a diagram illustrating the configuration of an existing electric power steering apparatus.

In an existing electric power steering apparatus, a first torque signal and a second torque signal are transmitted to an ECU 120 from a Torque and Angle Sensor (TAS) 110. Each of the first torque signal and the second torque signal transmitted from the TAS 110 satisfies an Automobile Safety Integrity Level (ASIL) B.

The ASIL is defined in ISO 26262 and represents the risk management criteria for functional elements in a vehicle. As the ASIL increases from A to D, the level of required reliability increases. The existing electric power steering apparatus receives the first torque signal and the second torque signal in the level of of ASIL B and performs signal processing in the level of ASIL B level for each of the first and second torque signals so as to implement a torque input signal in the level of ASIL D.

The ECU 120 of the existing electric power steering apparatus includes a Micro-Controller Unit (MCU) 121 and an inverter 122 therein.

The MCU 121 performs the functions of processing a torque signal, a steering angle signal, and a motor position signal input to the ECU 120 and controlling the inverter 122. The MCU 121 that processes signals is physically a single device, but has a self-diagnosis function using a check core therein.

The inverter 122 is connected to U, V, and W terminals of a single-wound BLAC (Brushless AC) motor 130 so as to control the operation of the single-wound BLAC motor 130.

The BLAC motor means a brushless motor having a back-electromotive force in the form of a sinusoidal waveform, and the single-winding BLAC motor 130 has one winding motor therein.

In the existing electric power steering apparatus, a first motor position signal and a second motor position signal are transmitted from a motor position sensor 140 to the ECU 120. As in the TAS 110, each of the first motor position signal and the second motor position signal satisfies the ASIL B, and the existing electric power steering apparatus receives the first motor position signal and the second motor position signal in the level of ASIL B and performs signal processing on each of the first motor position signal and the second motor position signal in the level of ASIL B so as to implement a motor position input signal in the level of ASIL D. The content of implementing a signal in the level of ASIL D by combining two signals in the level of ASIL B is defined in ISO 26262.

A battery 150 performs a function of supplying power to the ECU 120. When an abnormality occurs in the battery 150 and the supplied voltage is below a threshold, the ECU 120 may not operate normally.

Figure 2:
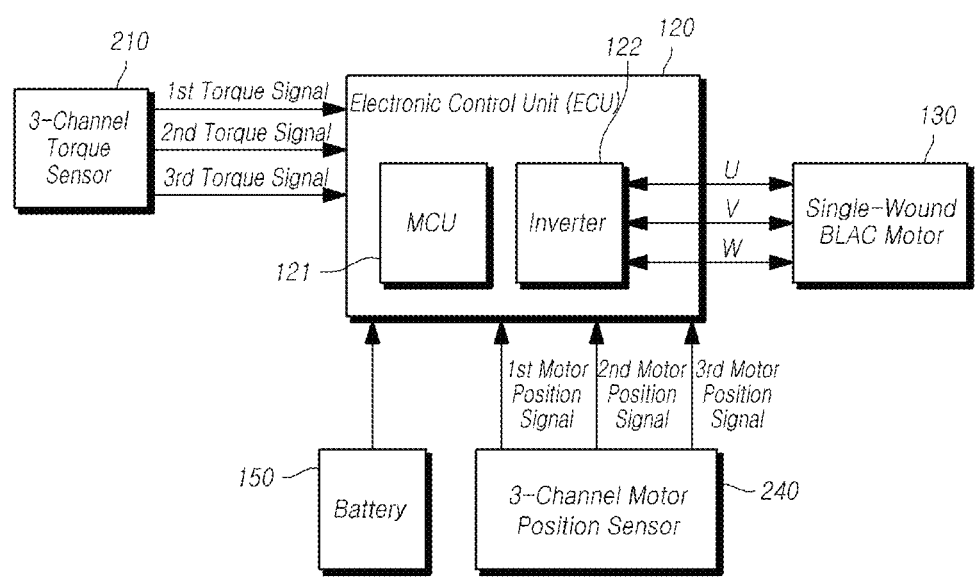
FIG. 2 is a diagram illustrating the configuration of an electric power steering apparatus according to one embodiment.

FIG. 2 is a diagram illustrating the configuration of an electric power steering apparatus according to one embodiment.

In the present embodiment, a three-channel torque sensor 210 may transmit a torque signal to an ECU 120 instead of the existing TAS 110.

The three-channel torque sensor 210 may transmit a first torque signal, a second torque signal, and a third torque signal to the ECU 120. As in TAS 110 of the existing electric power steering apparatus, each of the first torque signal, the second torque signal, and the third torque signal satisfies Automobile Safety Integrity Level (ASIL) B, respectively. The ECU 120 may compare the values of the first torque signal, the second torque signal, and the third torque signal so as to select a torque signal to be used for steering control.

More specifically, when all the values of the first torque signal, the second torque signal, and the third torque signal transmitted from the three-channel torque sensor 210 are the same, the ECU 120 may use the first torque signal for steering control, and when a difference occurs between one of the signal values of the first torque signal, the second torque signal, and the third torque signal of the three-channel torque sensor 210 and the remaining two signal values and the remaining two signal values are the same, one of the remaining two signal values may be used for steering control.

When all the torque signals are normal, the values of respective torque signals are the same, and thus any torque signal value may be used. Accordingly, the ECU 120 may basically use the first torque signal for steering control.

However, when a difference occurs between one of the signal values of the three torque signals and the signal values of the remaining two torque signals and the remaining two signal values are the same, the remaining two signal values may be used to implement a torque input signal in the level of highly reliable ASIL D. However, the different signal value has reliability in the level of ASIL B. Therefore, the ECU 120 may use the torque signal value of one of the two torque signals having the same signal value for steering control.

An example of a method of selecting a torque signal to be used for steering control is shown in Table 1 below.

TABLE 1

|  | Same or Different Signal Values | | | |
| --- | --- | --- | --- | --- |
| 1st Torque Signal & 2nd Torque Signal | ○ | ○ | X | X |
| 2nd Torque Signal & 3rd Torque Signal | ○ | X | ○ | X |
| 1st Torque Signal & 3rd Torque Signal | ○ | X | X | ○ |
| Torque Signal Used for Steering Control | 1st Torque Signal | 1st Torque Signal or 2nd Torque Signal | 2nd Torque Signal or 3rd Torque Signal | 1st Torque Signal or 3rd Torque Signal |

In Table 1, "○" means a case where the signal values of two torque signals are the same, and "X" means a case where the signal values of two torque signals are different. That is, when there are two or more torque signals having the same signal value, it is possible to determine a torque signal to be used for steering control.

In the present embodiment, instead of the existing motor position sensor 140, a three-channel motor position sensor 240 may transmit a motor position signal to the ECU 120.

The three-channel motor position sensor 240 may transmit a first motor position signal, a second motor position signal, and a third motor position signal to the ECU 120. Like each motor position signal of the motor position sensor 140 of the existing electric power steering apparatus, each of the first motor position signal, the second motor position signal, and the third motor position signal satisfies ASIL B. The ECU 120 may compare the values of the first motor position signal, the second motor position signal, and the third motor position signal so as to select a motor position signal to be used for motor control.

More specifically, when all the values of the first motor position signal, the second motor position signal, and the third motor position signal transmitted from the three-channel motor position sensor 210 are the same, the ECU 120 may use the first motor position signal for steering control, and when a difference occurs between one of the signal values of the first motor position signal, the second motor position signal, and the third motor position signal of the three-channel motor position sensor 210 and the remaining two signal values and the remaining two signal values are the same, one of the remaining two signal values may be used for motor control.

When all the three motor position signals described above are normal, the values of respective motor position signals are the same, and thus any motor position signal value may be used. Accordingly, the ECU 120 may basically use the first motor position signal for motor control.

However, when a difference occurs between one of the signal values of the three motor position signals and the signal values of the remaining two motor position signals and the remaining two signal values are the same, the remaining two signal values may be used to implement a motor position input signal in the level of highly reliable ASIL D. However, the different signal value only has reliability in the level of ASIL B. Therefore, the ECU 120 may use the motor position signal value of one of the two motor position signals having the same signal value for motor control.

An example of a method of selecting a motor position signal to be used for motor control is shown in Table 2 below.

TABLE 2

| | Same or Different Signal Values | | | |
|---|---|---|---|---|
| 1st Motor Position Signal & 2nd Motor Position Signal | ○ | ○ | X | X |
| 2nd Motor Position Signal & 3rd Motor Position Signal | ○ | X | ○ | X |
| 1st Motor Position Signal & 3rd Motor Position Signal | ○ | X | X | ○ |
| Motor Position Signal Used for Motor Control | 1st Motor Position Signal | 1st Motor Position Signal or 2nd Motor Position Signal | 2nd Motor Position Signal or 3rd Motor Position Signal | 1st Motor Position Signal or 3rd Motor Position Signal |

In Table 2, "○" denotes a case where the signal values of two motor position signals are the same, and "X" denotes a case where the signal values of two motor position signals are different. That is, when there are two or more motor position signals having the same signal value, it is possible to determine a torque signal to be used for motor control.

Figure 3:
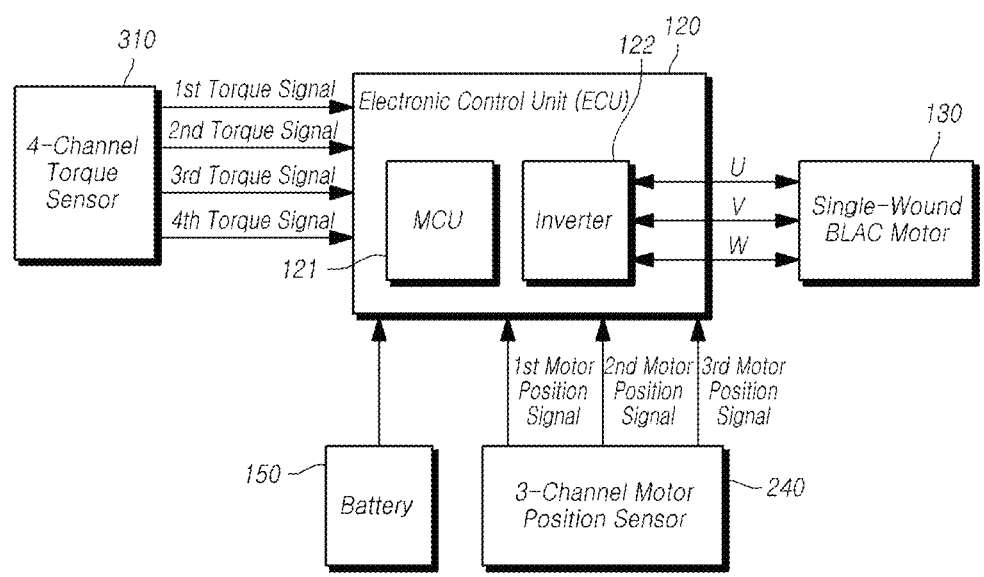
FIG. 3 is a diagram illustrating the configuration of an electric power steering apparatus according to another embodiment.

FIG. 3 is a diagram illustrating the configuration of an electric power steering apparatus according to another embodiment.

Compared with the embodiment of FIG. 2, in the present embodiment, a four-channel torque sensor 310 may transmit torque signals to the ECU 120 instead of the three-channel torque sensor 210. The four-channel torque sensor 310 may include two independent dual die ICs therein. The internal structure of the four-channel torque sensor 310 will be described in more detail with reference to FIG. 4.

The ECU 120 is capable of receiving four torque signals from the four-channel torque sensor 310. When a torque value is calculated using three torque signals, there is a problem in that a normal torque value cannot be calculated when the signal values of two torque signals are abnormal. However, when calculating the torque value using the four torque signals, even if the signal values of two torque signals are abnormal, when the signal values of the remaining two torque signals are the same, it is possible to calculate the torque value based on the same torque signal value, so that system reliability can be improved. That is, when two or more torque signals among the first torque signal, the second torque signal, the third torque signal, and the fourth torque signal have the same signal value, the torque ECU 120 is capable of calculating the torque value based on the same torque signal value.

An example of a method of selecting a torque signal to be used for steering control when using the four-channel torque sensor is shown in Table 3 below.

TABLE 3

| | | | | |
|---|---|---|---|---|
| $1^{st}$ Torque Signal | OK | OK | OK | OK |
| $2^{nd}$ Torque Signal | OK | NG | OK | OK |
| $3^{rd}$ Torque Signal | OK | OK | NG | OK |
| $4^{th}$ Torque Signal | OK | OK | OK | NG |
| Torque signal used for steering control | $1^{st}$ Torque Signal or $2^{nd}$ Torque Signal | $1^{st}$ Torque Signal or $3^{rd}$ Torque Signal | $1^{st}$ Torque Signal or $2^{nd}$ Torque Signal | $1^{st}$ Torque Signal or $2^{nd}$ Torque Signal |
| $1^{st}$ Torque Signal | NG | NG | NG | OK |
| $2^{nd}$ Torque Signal | OK | OK | OK | OK |
| $3^{rd}$ Torque Signal | OK | NG | OK | NG |
| $4^{th}$ Torque Signal | OK | OK | NG | NG |
| Torque signal used for steering control | $2^{nd}$ Torque Signal or $3^{rd}$ Torque Signal | $2^{nd}$ Torque Signal or $4^{th}$ Torque Signal | $2^{nd}$ Torque Signal or $3^{rd}$ Torque Signal | $1^{st}$ Torque Signal or $2^{nd}$ Torque Signal |
| $1^{st}$ Torque Signal | | OK | OK | NG |
| $2^{nd}$ Torque Signal | | NG | NG | NG |
| $3^{rd}$ Torque Signal | | OK | NG | OK |
| $4^{th}$ Torque Signal | | NG | OK | OK |
| Torque signal used for steering control | | $1^{st}$ Torque Signal or $3^{rd}$ Torque Signal | $1^{st}$ Torque Signal or $4^{th}$ Torque Signal | $1^{st}$ Torque Signal or $2^{nd}$ Torque Signal |

In Table 3, "OK" means that there is another torque signal having the same signal value, and "NG" means that there is no other torque signal having the same signal value. Referring to Table 3, it can be seen that it is possible to calculate a torque value when the values of two or more torque signals are the same. In addition, when the values of three or more torque signals are the same, the torque value is calculated using two smaller torque signal values. This is because when there are only two torque signals having the same value, reliability in the level of ASIL D can be ensured, as described above.

Figure 4:
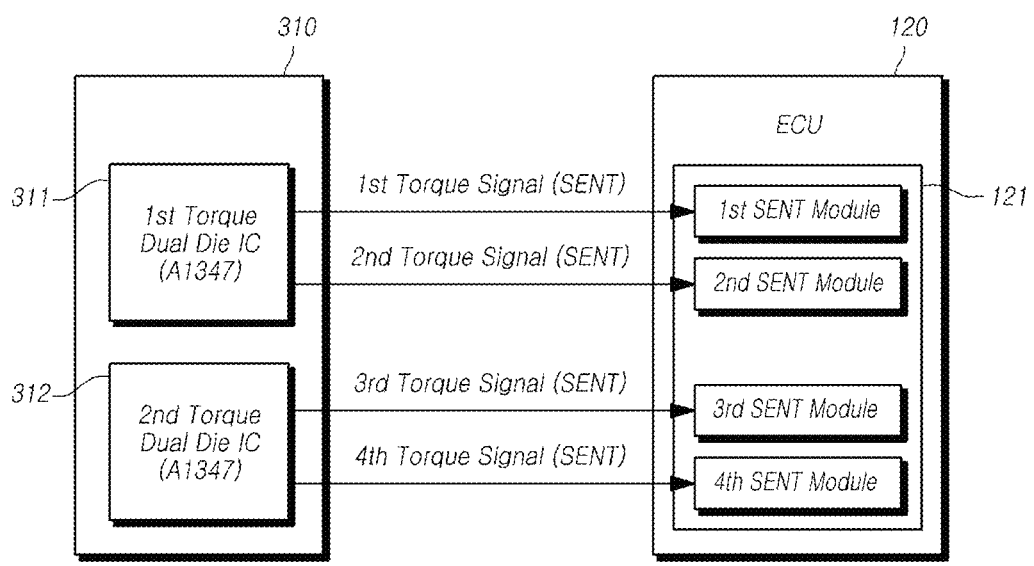
FIG. 4 is a diagram illustrating a configuration in which torque signals are transmitted from a four-channel torque sensor according to another embodiment of the present disclosure.

FIG. 4 is a diagram illustrating a configuration in which torque signals are transmitted from a four-channel torque sensor according to another embodiment of the present disclosure.

Referring to FIG. 4, a first torque dual die IC 311 and a second torque dual die IC 312 may be included in the four-channel torque sensor 310. Respective dual die ICs may be implemented by the same type of chips.

The first torque dual die IC 311 may send the first torque signal and the second torque signal to the ECU 120, and the second torque dual die IC 312 may send the third torque signal and the fourth torque signal to the ECU 120. The MCU 121 of the ECU 120 is capable of receiving the first torque signal, the second torque signal, the third torque signal, and the fourth torque signal. As described above, the ECU 120 is capable of combining two torque signals in the level of ASIL B among the four torque signals in the level of ASIL B transmitted thereto, thereby implementing a torque signal having reliability in the level of ASIL D.

Each of the torque signals described above may be transmitted using a Single Edge Nibble Transmission (SENT) protocol. The SENT protocol is a unidirectional protocol standard that can be used to transmit and receive high resolution sensor data such as temperature, pressure, and position in a vehicle.

Even if it was described above that all of the components of an embodiment of the present disclosure are coupled as a single unit or coupled to be operated as a single unit, the present disclosure is not necessarily limited to such an embodiment. That is, at least two elements of all structural elements may be selectively joined and operate without departing from the scope of the present disclosure.

Although the embodiments of the present disclosure have been described for illustrative purposes, those skilled in the art will appreciate that various modifications, additions and substitutions are possible, without departing from the scope and spirit of the disclosure. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

What is claimed is:

1. An electric power steering apparatus comprising:
a three-channel torque sensor;
a three-channel motor position sensor;
a single-wound Brushless AC (BLAC) motor; and
an Electronic Control Unit (ECU) configured to control steering.

2. The electric power steering apparatus of claim 1, wherein, when all of a first torque signal, a second torque signal, and a third torque signal of the three-channel torque sensor have a same value, the ECU uses the first torque signal for steering control, and
when two of the first torque signal, the second torque signal, and the third torque signal of the three-channel torque sensor have a same value and a remaining signal value is different from the same value, the ECU uses the same signal value for steering control.

3. The electric power steering apparatus of claim 1, wherein, when all of a first motor position signal, a second motor position signal, and a third motor position signal of the three-channel motor position sensor have a same signal value, the ECU uses the first motor position signal for motor control, and
when two of the first motor position signal, the second motor position signal, and the third motor position signal of the three-channel motor sensor have a same signal value and a remaining signal value is different from the same signal value, the ECU uses the same signal value as the signal value for steering control.

4. An electric power steering apparatus comprising:
a four-channel torque sensor comprising two independent dual die ICs;
a three-channel motor position sensor;
a single-wound Brushless AC (BLAC) motor; and
an ECU configured to control steering.

5. An electric power steering apparatus of claim 4, wherein, when two or more of the first torque signal, the second torque signal, the third torque signal, and the fourth torque signal of the four-channel torque sensor have a same torque signal value, the ECU calculates a torque value based on the same torque signal value.

6. An electric power steering apparatus of claim 4, wherein, when all of a first motor position signal, a second motor position signal, and a third motor position signal of the three-channel motor position sensor have a same signal value, the ECU uses the first torque signal for motor control, and
when a signal value of one of the first motor position signal, the second motor position signal, and the third motor position signal of the three-channel motor position sensor is different from remaining two signal values, and the remaining two signal values are equal to each other, the ECU uses one of the remaining two signal values for motor control.

* * * * *